2,898,351
PROCESS FOR THE PREPARATION OF ENOL ESTERS

Almer Middelbeek, Eduard Marie de Graaf, and Pieter Modderman, Oss, Netherlands, assignors to Organon Inc., Orange, N.J., a corporation of New Jersey No Drawing. Application October 12, 1956
Serial No. 615,450

Claims priority, application Netherlands October 20, 1955

2 Claims. (Cl. 260—397.5)

This invention relates to the preparation of enol esters. More particularly it relates to the preparation of enol esters of 20-ketosteroids.

It is known that enol acylation can be performed in the presence of an acylating catalyst in a very large excess of the carboxylic anhydride used for the acylation. In said process the anhydride is distilled off slowly. In J. Am. Chem. Soc. 70, 1838 (1948), a process is disclosed wherein 75 ml. of acetic anhydride are used in the preparation of enol acetates of 20-ketopregnane derivatives for 2 millimols of ketone.

It was found that, if the esterification is carried out by means of acid anhydride in the presence of a ketene, far less acid anhydride is necessary to obtain at least equally good results. This result is probably obtained because the ketene reconverts the carboxylic acid formed in the esterification reaction into the corresponding acid anhydride.

According to the present invention hereinafter described in detail, the enol esterification of a ketone with a carboxylic anhydride in the presence of an acylating catalyst is carried out in the presence of a ketene in the reaction mixture.

The ketene can be brought into the reaction mixture in several ways. One method, for instance, consists in leading it into the mixture in the form of a gas. The reaction mixture can also be boiled under reflux and a ketene can then be added to the condensate formed in the reflux condenser before returning said condensate into the reaction chamber, as a result of which the condensate carries along the ketene.

Though, in general, it is desirable and to be recommended to use a ketene, which corresponds to the employed anhydride, this is not necessary if the enol ester is of importance only as an intermediate product and is consequently further processed without isolation. For, in such case, there is no objection to a mixture of several esters being formed. Formation of such a mixture, of course, is possible if the acid anhydride is regenerated with a non-corresponding ketene.

The acylation according to the present invention can be carried out in principle with any simple or mixed carboxylic anhydride, e.g. acetic anhydride, propionic anhydride, butyric anhydride, isobutyric anhydride, valeric anhydride, caproic anhydride, phenylacetic anhydride, and phenylpropionic anhydride. It has been found preferable to use acetic anhydride.

Suitable acylating catalysts used in the invention are: hydrochloric acid, sulfuric acid, p-toluene sulfonic acid, perchloric acid, and the like.

An object of the invention is to provide a method of converting enol esters by the use of a ketene.

The invention is of special importance for the formation of enol esters of ketosteroids, in particular 20-ketosteroids. Examples of ketosteroids which according to the invention can be acylated obtaining a high yield while using only a relatively small quantity of acid anhydride are 3α-acetoxy-11,20-diketo-pregnane, 3β-acetoxy-5,6-dichloro-20-ketopregnane, 3α-acetoxy-20-ketopregnane, 3β-acetoxy-20-ketoallopregnane, cholestanone and coprostanone.

The acetylation of 3α-acetoxy-11,20-diketo-pregnane is of great importance for the synthesis of cortisone and cortisone esters.

From J. Am. Chem. Soc. 74, 485 (1952), the preparation of 3α,17α-dihydroxypregnane-11,20-dione is known whereby 3-hydroxy-11,20-diketopregnane is triacetylated in the presence of p-toluenesulfonic acid to $\Delta^{9(11),17(20)}$-pregnadiene-3α,11,20-trioltriacetate, converting this triacetate with a peracid into 17α(20)-epoxy-$\Delta^{9(11)}$-pregnene-3α,11,20-triol-triacetate, and finally saponifying this compound. The yield of this 3-step process amounts to only about 70%.

In accordance with the present invention applicants have increased this yield to about 85% by carrying out the acetylation in the presence of ketene while using only 5 kg. of acetic anhydride to 1 kg. of steroid and a corresponding smaller quantity of p-toluene sulfonic acid.

The following examples are given as illustrations of the invention and are not to be considered as limiting the invention in any way.

Example I 100 g. of 3α-acetoxy-11,20-diketopregnane and 5 g. of p-toluene sulfonic acid are dissolved in 500 ml. of acetic anhydride and the reaction mixture is heated to boiling. After boiling under reflux for 5 hours in which a stream of about 7 liters of ketene per hour is passed into the reaction mixture, the conversion is complete. The cooled reaction mixture is poured on 2.5 liters of ice water, then extracted with chloroform, and the extract is washed with dilute Na-bicarbonate or similarly mild alkaline solution and water until a neutral reaction is obtained. After evaporating the solvent in vacuo the resultant crude $\Delta^{9(11)17}$-3α,11,20-triacetoxy-pregnadiene can directly be used for further processing to the 3α,17α-dihydroxy-3,11-diketopregnane. In the crude $\Delta^{9(11)17}$-3α,11,20-triacetoxy-pregnadiene no starting material can be detected by means of paper chromatography (propyleneglycol-heptane system) which indicates that conversion has taken place practically quantitatively. The pure dienoltriacetate can be recovered from the crude product after decolorizing with $Al_2O_3$ and recrystallizing from ethyl acetate. It has a M.P. between 199–201° C. and an optical activity of $(\alpha)_D$ +105°.

Example II 10 g. of 3β-acetoxy-5,6-dichloro-20-ketopregnane are dissolved in 50 ml. of acetic anhydride. After adding 0.5 g. of p-toluene sulfonic acid, the reaction mixture is heated to 20° C. and a stream of about 1 liter of ketene per hour is passed through the mixture. After about 5 hours the reaction is complete as shown by means of paper chromatography. Working up of the reaction mixture is then carried out as described in Example I. The pure $\Delta^{17}$-3β,20-diacetoxy-5,6-dichloropregnene melts at about 155° C.

Example III 25 g. of cholestanone are dissolved in 150 ml. of acetic anhydride and then 2 g. of p-toluene sulfonic acid are added. Then the mixture is heated to 35° C., after which a stream of about 2 l. of ketene per hour is passed through the mixture for two hours. Then the mixture is cooled and poured into 1 l. of ice-water. Subsequently the aqueous mixture is extracted with chloroform, the extract is washed with a dilute sodium bicarbonate solution and then with water, after which the chloroform is evaporated at a low pressure. Then the residue is recrystallized from isopropyl ether. Thereby, 23.95 g.

of cholestanone-3-enol acetate are obtained with a melting-point of 89–90° C. and $(\alpha)_D=+57°$.

*Example IV*

80 g. of coprostanone are dissolved in 400 ml. of acetic anhydride, whereafter 0.5 ml. of perchloric acid is added to the solution. The mixture is heated to boiling and then a stream of about 1.5 l. of ketene per hour is passed through the mixture for 4 hours. Then the mixture is treated in an analogous manner as described in Example III, whereby 73.15 g. of coprostanone-3-enol acetate are obtained with a melting point of 80–82° C. and $(\alpha)_D=+37°$.

*Example V*

10 g. of p-toluene sulfonic acid are added to a solution of 63 g. of 3β-hydroxy-20-oxo-allopregnane in 700 ml. of acetic anhydride. This mixture is heated to 40° C., after which a stream of ketene is passed through the mixture for 5 hours at a rate of about 2 l. of ketene per hour. After the mixture has been cooled, it is evaporated at a low pressure to half its volume, whereafter the remaining solution is poured into 1 l. of ice-water. Subsequently, the mixture is extracted with ether, the ethereal layer is separated, washed first with a dilute NaOH-solution and then with water. Then the ethereal layer is dried over sodium sulfate and the ether is evaporated. The residue is recrystallized a few times from benzene-petroleum ether, whereby the $\Delta^{17(20)}$-3β,20-diacetoxy-allopregnene (cis and trans isomers) is obtained in a yield of 75%. Chromatographic separation of these isomers yields the $\Delta^{17(20)}$-3β,20-diacetoxy-allopregnene (cis) with a melting point of 121–123° C. and $(\alpha)_D=+21°$ (chloroform) and the $\Delta^{17(20)}$-3β,20-diacetoxy-allopregnene (trans) with a melting point of 172–174° C. and $(\alpha)_D=+12°$ (chloroform).

It will be apparent from the foregoing description of the invention that by the use of ketene a definite increase in the yield of the ketosteroid is obtained without requiring a succession of tedious steps and operations.

While preferred methods of obtaining ketosteroids have been described hereinabove, it is to be understood that changes as to steps and use of materials may be made without departing from the spirit and scope of the invention as claimed.

We claim:

1. Process for the preparation of an enolacetate of a 20-ketosteroid of the pregnane series having in 3-position a substituent selected from the group consisting of an acyloxy and a hydroxy group, which comprises reacting the 20-ketosteroid with an amount of acetic anhydride of at least 10 mol per 1 mol of steroid, at a temperature between about 20° C. and the boiling point of the reaction mixture, in the presence of ketene and an acetylation catalyst comprising a strong acid, and recovering the enolacetate.

2. Process for the preparation of $\Delta^{9(11),17}$-3α,11,20-triacetoxypregnadiene which comprises reacting 3α-acetoxy-11,20-diketopregnane with an amount of acetic anhydride of at least 10 mol per 1 mol of steroid, at a temperature between about 20° C. and the boiling point of the reaction mixture, in the presence of ketene and an acetylation catalyst comprising a strong acid, and recovering the pregnadiene ester.

References Cited in the file of this patent

UNITED STATES PATENTS

| | | |
|---|---|---|
| 2,684,980 | Mawer | July 27, 1954 |
| 2,673,865 | Spero | Mar. 30, 1954 |
| 2,691,030 | Murray | Oct. 5, 1954 |

OTHER REFERENCES

Gwynn, B. H., and Degering, E. F.: J. Am. Chem. Soc., vol. 64, pages 2216–2218, September 1942.